No. 857,884. PATENTED JUNE 25, 1907.
J. M. MEREDITH, Jr.
FISH SCALING AND SLITTING MACHINE.
APPLICATION FILED MAR. 6, 1906.
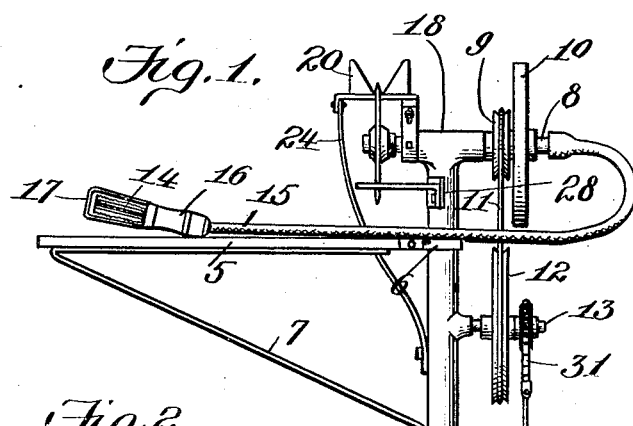
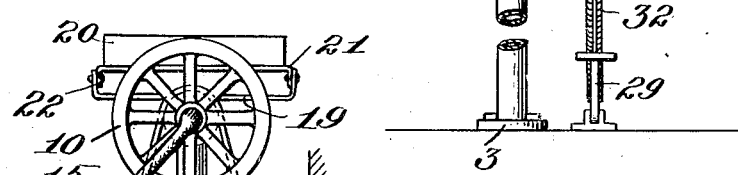
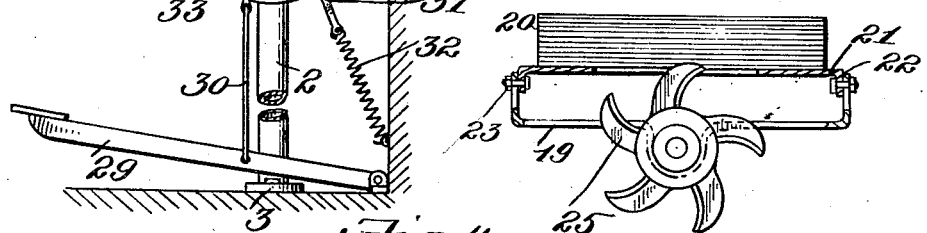
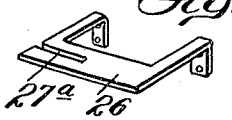

UNITED STATES PATENT OFFICE.

JAQUELIN M. MEREDITH, JR., OF NORFOLK, VIRGINIA.

FISH SCALING AND SLITTING MACHINE.

No. 857,884.      Specification of Letters Patent.      Patented June 25, 1907.

Application filed March 6, 1906. Serial No. 304,530.

*To all whom it may concern:*

Be it known that I, JAQUELIN M. MEREDITH, Jr., a citizen of the United States, residing at Norfolk, in the county of Norfolk and State of Virginia, have invented new and useful Improvements in Fish Scaling and Slitting Machines, of which the following is a specification.

This invention relates to a fish scaling and slitting machine, the object of the invention being to provide an effective device of this character for performing these operations in a rapid, thorough manner. The machine is so organized that the slitting knife may be employed for cutting off the heads of the fish.

In the drawings accompanying and forming a part of this specification, I illustrate in detail one form of embodiment of the invention which to enable those skilled in the art to practice said invention, I will set forth fully in the following description, while the novelty of said invention will be included in the claims succeeding said description.

Referring to said drawings, Figure 1 is a front elevation of a machine including my invention. Fig. 2 is a side elevation of the same as seen from the right in Fig. 1. Fig. 3 is a side elevation partly in section of a fish supporting trough, a slitting knife and certain coöperating parts. Fig. 4 is a top plan view of a table for supporting the fish while being scaled. Fig. 5 is a perspective view of a bracket for supporting the fore part of the fish while the head thereof is being taken off.
Like characters refer to like parts throughout the several figures.

The different parts of the machine may be supported upon any suitable framework. The framework illustrated includes in its make-up a vertically disposed standard or column 2 which can be inexpensively made from tubing and which has a base or foot as 3 to be fastened by screws or other suitable means to a floor or other foundation. Extending laterally from the column between its top and bottom I have shown an arm as 4 which may be attached by suitable means as screws to a wall or other part.

Ordinarily I first scale the fish and while doing so support it upon a suitable table or bracket, as 5, shaped preferably, though not necessarily in the form of a fish. This table or bracket is attached by a clip as 6 to the column or standard 2 and to its under side is fastened one branch of an angular brace as 7, the other branch of said brace being attached rigidly to the column 2, whereby the table will be upheld in a substantial manner.

Supported by a suitable bearing above the table 5 is a shaft 8 which carries a driven member as 9 and a balance wheel as 10. The driven member is shown as a band wheel and is connected by a band as 11 with the driving band wheel 12 supported upon a shaft 13 located below the shaft 8. The column 2 is provided with a suitable bearing for the shaft 13. The band wheels 9 and 12 are fastened in any desirable manner to their respective shafts, from which it will be evident that when the band wheel 12 is driven the upper shaft 8 will be rotated. Other means than that set forth may of course be provided for operating the upper shaft while any suitable means may be employed for actuating the shaft 13, although I will hereinafter briefly set forth the mechanism shown for accomplishing the last-mentioned operation.

In the present instance the scaling and slitting devices are connected with the shaft 8 and as the scaling operation is the one that usually takes place first, I will describe the scaling instrument. The scaling instrument is denoted in a general way by 14 and it consists of an elongated hub having a plurality of longitudinal knives, the cutting edges of which are provided with saw-teeth to add to the efficiency of said scaling instrument. The scaling instrument 14 is connected with the shaft 15 so as to be rotated thereby, while the shaft 15 is connected with the shaft 8 in such way as to be turned by the latter. It will, therefore, be obvious that when the shaft 8 is in action the scaling device 14 will be rotated. The shaft 15 is flexible so that the scaling device can be brought to any desired position for use within the range of action of the shaft 15 and can be manipulated to bring it in contact with every part of the scale-surface of the fish to remove cleanly all the scales from such fish, and while the latter rests upon the horizontal table 5. The flexible shaft 15 has swiveled therearound adjacent the scaling device a handle 16 by which the scaling device can be by an operator caused to act upon every part of the fish on the table 5. A rest is shown at 17. The rest 17 is of approximately looped form, its side branches being connected with the handle 16. One or the other of these side branches during the scaling operation will engage the surface of the fish so as to position the scaling device in proper relation with the fish during the scaling operation.

The column 2 has a head 18 to which is fastened a strip 19 constituting a suitable support for the trough 20. The trough includes in its make-up a base plate 21 having down-turned ears 22 at its opposite ends connected by screws or in some other suitable way, as shown at 23, to the opposite upturned ends of the strip 19. The screws 23 extend through longitudinal slots in the opposite upturned ends of said strip 19. The ears or flanges 22 are located at the inner side of the trough 20 and depending from the forward side of said trough is a brace 24 which is adjustably connected with the column 2. By the construction described it will be evident that I provide for the vertical adjustment of said trough 20. The fish to be slitted is placed belly downward in the trough to be brought under the action of a cutter or a knife as 25 which works through a longitudinal slot in the bottom of said trough, as clearly shown in Fig. 3. By having the trough adjustable vertically I make provision for slitting fish which vary in depth.

In some cases it is desirable to remove the heads of the fish, for which purpose the knife or cutter 25 may be utilized. This knife or cutter may be supported in any desirable way although for simplicity and compactness it is fastened to the shaft 8 at the end thereof opposite to that to which the flexible shaft 15 is connected. During the time the head of the fish is being taken off the fore part thereof may be supported by a bracket or shelf as 26, see Fig. 5, for example, said bracket having a slit as 27ᵃ to receive the knife or cutter 25. The arms of the shelf or bracket 26 are connected to a cross piece as 28 fastened to the column 2. The head of the fish when removed passes down the opening between the body of the bracket 26 and the column 2.

In the present case the means for rotating the shaft 13 is operated from the foot and involves a suitably fulcrumed treadle as 29. To this treadle between the pedal and fulcrum thereof is shown as connected a rod or link as 30 attached at its upper end to a sprocket chain as 31. One end of the chain is connected with said rod or link, while the opposite end of said chain is connected with a spring as 32 united with some suitable fixture, said chain running over the sprocket wheel 33 on the shaft 13. The sprocket wheel 33 runs loose on its shaft and is adapted to be connected to the band wheel 12 by a suitable clutch. I do not deem it necessary to show in detail this clutch for it is of a familiar type, or of such character that when the treadle 29 is depressed the band wheel 12 will be rotated while on the return or upward movement of the said treadle the sprocket wheel 33 will be out of operative relation with said band wheel. It will be evident that the upward motion of the treadle 29 is effected by the spring 32 acting against said treadle through the intermediate chain 31 and rod 30.

What I claim is:

1. In an apparatus of the class described, the combination of a trough for receiving a fish, having a slot, a cutting device to work through said slot, for slitting a fish in said trough, and a bracket supported in coöperative relation with said cutting device and to support the forepart of a fish for decapitation by said cutting device.

2. In an apparatus of the class described, the combination of a trough for receiving a fish and having a slot in its bottom, a rotary cutting device to work through said slot for slitting the fish in said trough, and a bracket having a slot to receive said cutting device and supported below the trough for upholding the forepart of a fish for decapitation by said cutting device.

3. In an apparatus of the class described, a support for a fish, a scaling device for scaling said fish, a flexible shaft to which the scaling device is rotatively connected, a rotative stiff shaft for turning said flexible shaft, and a slitting device for the fish connected with said stiff shaft.

In testimony whereof I have hereunto set my hand in presence of two subscribing witnesses.

JAQUELIN M. MEREDITH, Jr.

Witnesses:
HESIT SUTHERLAND,
JAMES L. NORRIS, Jr.